United States Patent [19]
Pan

[11] Patent Number: 5,687,998
[45] Date of Patent: Nov. 18, 1997

[54] COUPLING DEVICE

[76] Inventor: Tzung Ting Pan, No. 153, San Ming Road, San Chung City, Taipei Hsien, Taiwan

[21] Appl. No.: 650,774

[22] Filed: May 20, 1996

[51] Int. Cl.$^6$ ................................................. F16L 55/00
[52] U.S. Cl. ........................ 285/175; 285/177; 285/338
[58] Field of Search .................................... 285/162, 338, 285/196, 346, 298, 302, 175, 177

[56] References Cited

U.S. PATENT DOCUMENTS

| | | | |
|---|---|---|---|
| 2,031,754 | 2/1936 | Bacigalupi | 285/302 X |
| 2,574,109 | 11/1951 | Kane et al. | 285/338 X |
| 3,421,782 | 1/1969 | Kalish et al. | 285/338 X |
| 3,709,260 | 1/1973 | Windle | 285/338 X |
| 3,768,839 | 10/1973 | Thompson | 285/338 X |

*Primary Examiner*—Dave W. Arola
*Attorney, Agent, or Firm*—Bacon & Thomas

[57] ABSTRACT

A coupling device includes a coupling body, an expandable ring, a washer and a press guide tube. The coupling body includes a substantially cylindrical coupling head and a screw rod; wherein the coupling head consists essentially of an obliquity portion and a receiving portion, a longitudinal slot being provided within the coupling body and passing therethrough, the longitudinal slot communicating with the gas or liquid inside a to-be-detected device or object. The expandable ring and the washer are respectively fitted onto the receiving portion of the coupling body. The expandable ring is provided to enable the coupling body and a circular slot to be coupled tightly. The washer prevents the gas or liquid leakage from the contact surface between the coupling body and the circular slot.

11 Claims, 5 Drawing Sheets

COUPLING DEVICE

BACKGROUND OF THE INVENTION (a) Field of the Invention

The present invention relates to a coupling, and more particularly to a coupling device with leak-proof functions.

(b) Description of the Prior Art

There are numerous specifications of couplings used in high-pressure piping of car air conditioning systems. For instance, the pitch of teeth of couplings may vary extensively, so is their size. Besides, there are many shapes of couplings. Consequently, it is necessary to prepare various types of couplings in maintenance, such as when detecting where leakage of gas or liquid occurs in the piping system, which is very inconvenient to technicians and causes increase in maintenance costs.

SUMMARY OF THE INVENTION

Because most high-pressure pipelines and apparatuses (such as compressors) used in high-pressure piping systems have circular slots, the present invention is developed as a kind of coupling device which may prevent leakage, simplify the maintenance job and reduce the types of required maintenance tools.

Accordingly, a primary object of the present invention is to provide a coupling device for coupling with an object with a circular slot or a circular pipe to prevent gas or liquid within the object or pipe to leak from the joint between the coupling device and the circular slot or circular pipe.

Another object of the present invention is to provide a coupling device for simplifying maintenance procedures and reducing the kinds of necessary maintenance tools in maintaining air conditioning systems of cars.

In order to achieve the above-mentioned objects, the coupling device of the present invention essentially comprises a coupling body, an expandable ring, a washer and a press guide tube. The coupling body includes a substantially cylindrical coupling head and a screw rod; the coupling head in turn consists essentially of an obliquity portion and a receiving portion, a longitudinal slot being provided within the coupling body and passing therethrough, the longitudinal slot communicating with the gas or liquid inside a to-be-detected device or object. The expandable ring and the washer are respectively fitted onto the receiving portion of the coupling body. The expandable ring is provided to enable the coupling body and a circular slot to be coupled tightly; the expandable ring disposed near a front end of the coupling head expands when the guide tube displaces towards the coupling head. The washer is provided to prevent leakage from the contact surface between the coupling body and the circular slot and is made of resilient material such as rubber so that its diameter may increase upon the forward displacement of the guide tube. The guide tube has multiple inner threads for matching the screw rod of the coupling body and is capable of longitudinal displacement to press the expandable ring towards the obliquity portion of the coupling body.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 8:
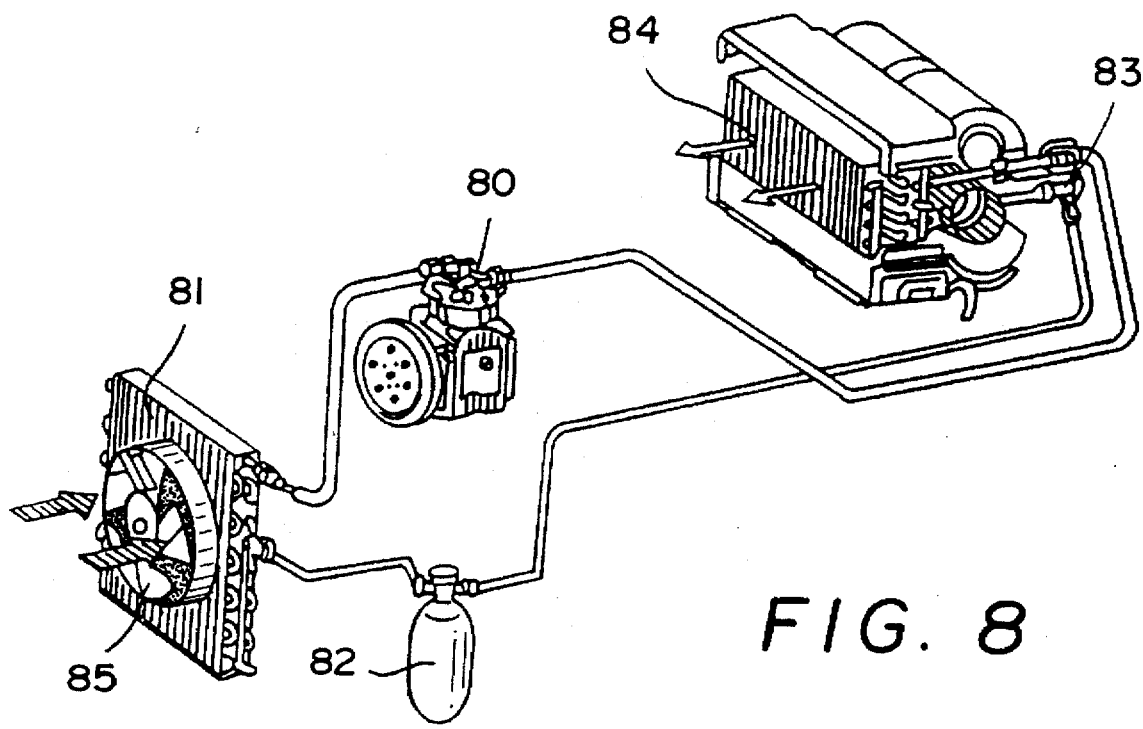
FIG. 8 is a schematic diagram of a car air conditioning system.

With initial reference to FIG. 8, which shows a car air conditioning system, a refrigerant of the system is circulated through a compressor 80, a condenser 81, a reservoir 82, an expansion valve 83 and an evaporator 84 in sequence to generate cooling effects. The refrigerant will leak when the devices of the system or joints in the piping are loosened or damaged, resulting in reduced cooling effects.

Figure 9:
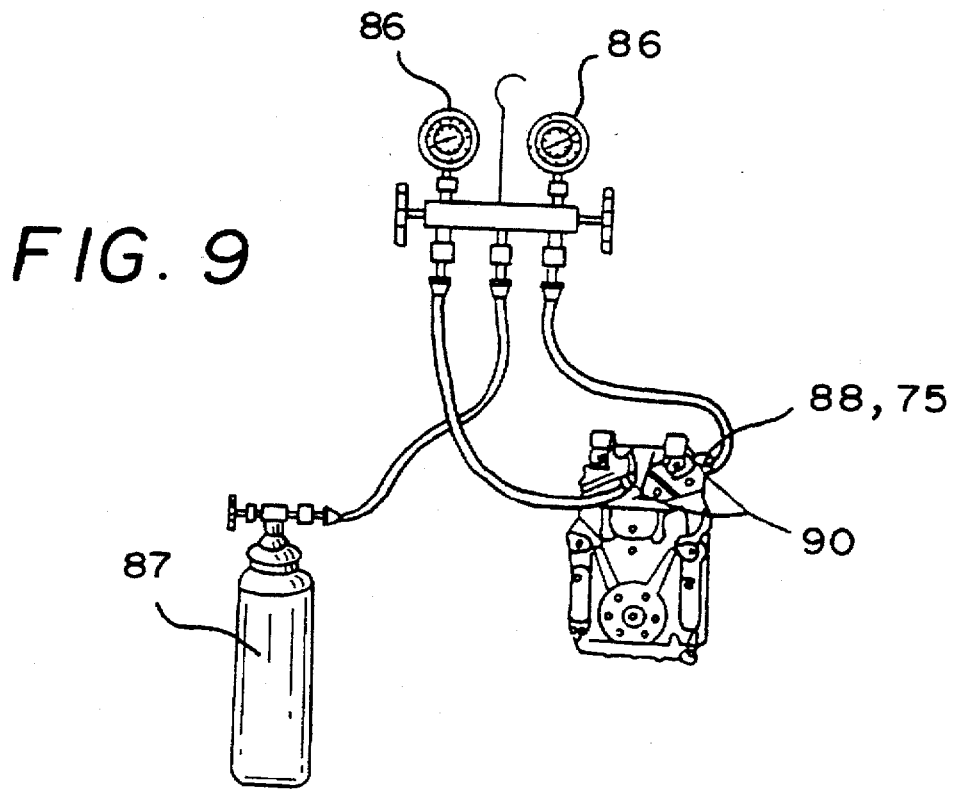
FIG. 9 is a schematic diagram showing detection of a compressor in an enclosed state.

To detect where leakage occurs, it is necessary to use a high-pressure pump 87 to induce high-pressure gas into the detected device until a set pressure within the device is reached. By reading from a pressure meter 86, it can be determined whether there is any drop in pressure. FIG. 9 shows compressor 80 under detection. As a hose coupling 88 must be connected to a slot (usually circular) of the to-be-detected device, such as the compressor 80 in FIG. 9, the compressor 80 having two circular slots 90, the simplest way of connecting the hose coupling 88 thereto is to provide a coupling device 1 therebetween so that high-pressure gas may be induced into the compressor 80. The coupling device 1 must be capable of providing a sufficient connecting force so that it will not easily slip out of the circular slot 90 as a result of the induced high-pressure gas. In addition, it should be ensured that there is no leakage at the joint between the coupling device i and the circular slot 90.

As the kind of to-be-detected devices or apparatuses is numerous, e.g., the compressor 80, the condenser 81, the reservoir 82 or other piping or various devices or parts not related to car maintenance, the present invention is applicable as long as the to-be-detected devices or apparatuses are provided with the circular slot 90. Hence, the present invention will be described and illustrated with reference to the circular slot 90 only.

The coupling device i of the present invention is provided to achieve connection and prevention of gas or liquid leakage. It may also be adopted to connect gas or liquid in two pieces of piping.

Figure 1:
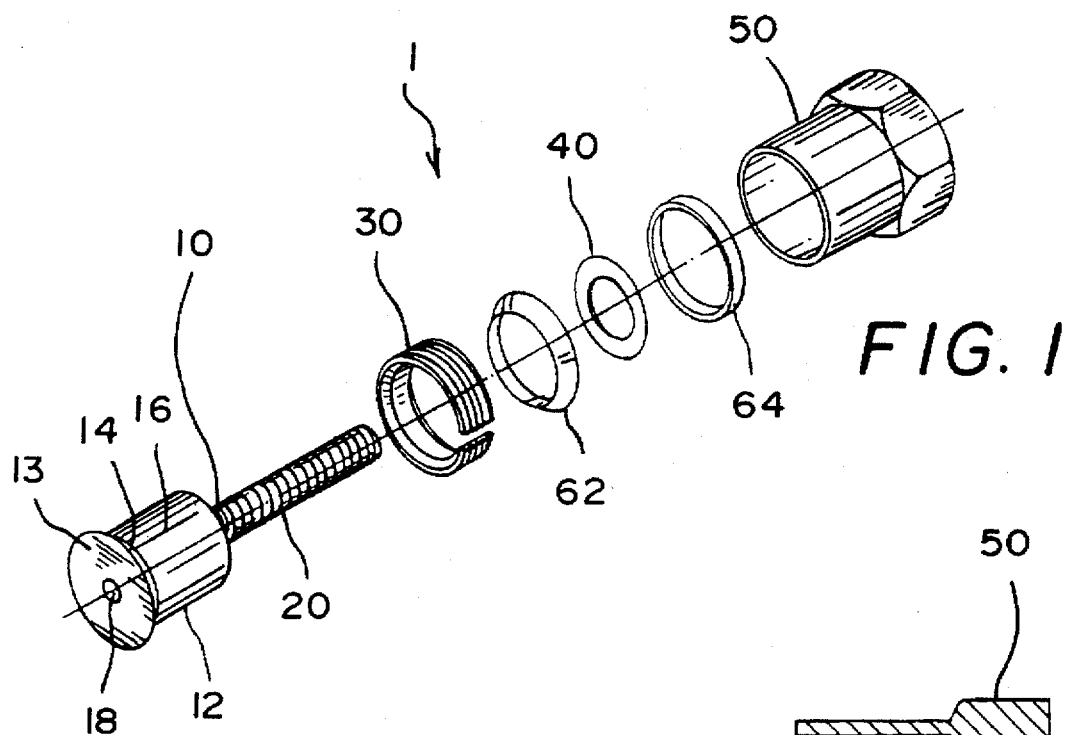
FIG. 1 is an exploded elevational view of a first preferred embodiment of the coupling device of the present invention.

With reference to FIG. 1, from left to right of the drawing, a first preferred embodiment of the coupling device 1 consists of a coupling body 10, an expandable ring 30, an oblique ring 62, a washer 40, an anti-friction ring 64 and a press guide tube 50.

The coupling body 10 consists of a substantially cylindrical coupling head 12 and a screw rod 20. The coupling head 12 in turn consists of an oblique portion 14 and a receiving portion 16. The oblique portion 14 has a front section with a larger diameter and the diameter of its section diminishes in a direction towards the receiving portion 16. It should be noted that it is not necessary for the oblique portion 14 to diminish in diameter right from a front end 13 of the coupling body 10. A longitudinal slot 18 is disposed within the coupling body 10 (preferably at the center) and passing therethrough.

In assembling the coupling device 1, with reference to FIG. 1, the expandable ring 30, the oblique ring 62, the washer 40 and the anti-friction ring 64 are fitted onto the receiving portion 16 of the coupling head 12 in turn.

Figure 2:
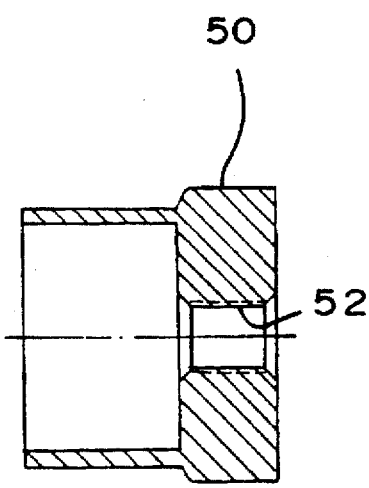
FIG. 2 is a sectional view of a press guide tube of the present invention.

Reference is now made to FIG. 2. As the guide tube 50 is provided with a plurality of inner threads 52 for matching a plurality of outer threads of the screw rod 20, it may be screwably fitted onto the screw rod 20 (the screw rod 20 being a first screw rod in the first preferred embodiment). The head portion of the guide tube 50 may be configured to be hexagonal in order that it may be turned by a conventional Allen wrench.

The function of the guide tube 50 is to push the expandable ring 30, the oblique ring 62, the washer 40 and the anti-friction ring 64 towards the oblique portion 14 of the coupling head 12. In this preferred embodiment, the expandable ring 30 is a C-clip.

The C-clip for expandable ring 30 proximate the front end 13 of the coupling body 10 is configured to match the oblique portion 14 of the coupling head 12 (see FIG. 5A or FIG. B), so that it may expand when the guide tube 50 pushes forwardly towards the front end 13. The diameter of the section of the C-clip or expandable ring 30 may be increased such that the C-clip may couple with the circular slot 90 as a result of friction (see FIG. 3). By means of this arrangement, the closer the guide tube 50 pushes towards the front end of the coupling body 10, the greater the coupling force of the C-clip expandable ring 30 and the circular slot 90. Therefore, the C-clip expandable ring 30 is provided to enable the coupling body 10 to be firmly and tightly coupled with the circular slot 90. In order to increase the frictional force between the C-clip expandable ring 30 and the circular slot 90, the outer surface of the C-clip expandable ring 30, i.e., the surface in contact with the circular slot 90, is preferably configured to have corrugated teeth.

Figure 5A:
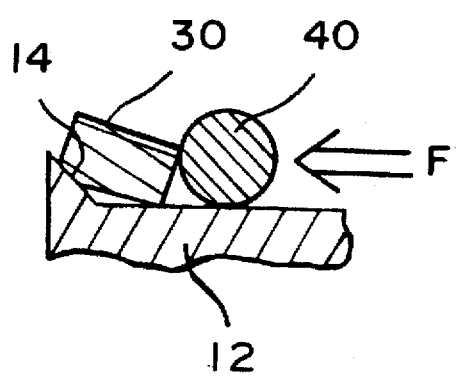
FIG. 5A is a sectional view showing an expandable ring having an oblique surface subjected to a force.
Figure 5B:
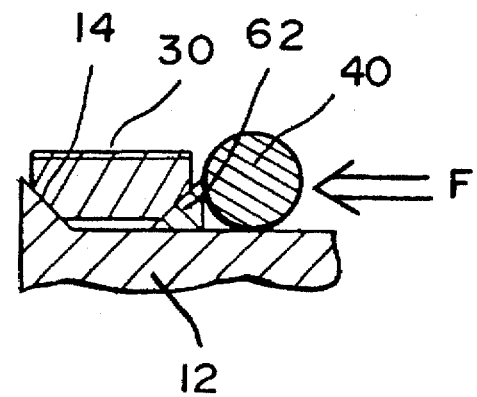
FIG. 5B is a sectional view showing an expandable ring having two oblique surfaces subjected to a force.

The section of the C-clip expandable ring 30 is preferably configured to have two oblique angles, as shown in FIG. 5B. The oblique ring 62 is therefore used to enable the C-clip expandable ring 30 to be expanded in a uniform or even manner. If the C-clip expandable ring 30 has only one oblique angle, as shown in FIG. 5A, the oblique ring 62 becomes unnecessary. Then the C-clip expandable ring 30 cannot uniformly expand. The result is that the coupling of the C-clip expandable ring 30 and the circular slot 90 becomes weaker.

Figure 4:
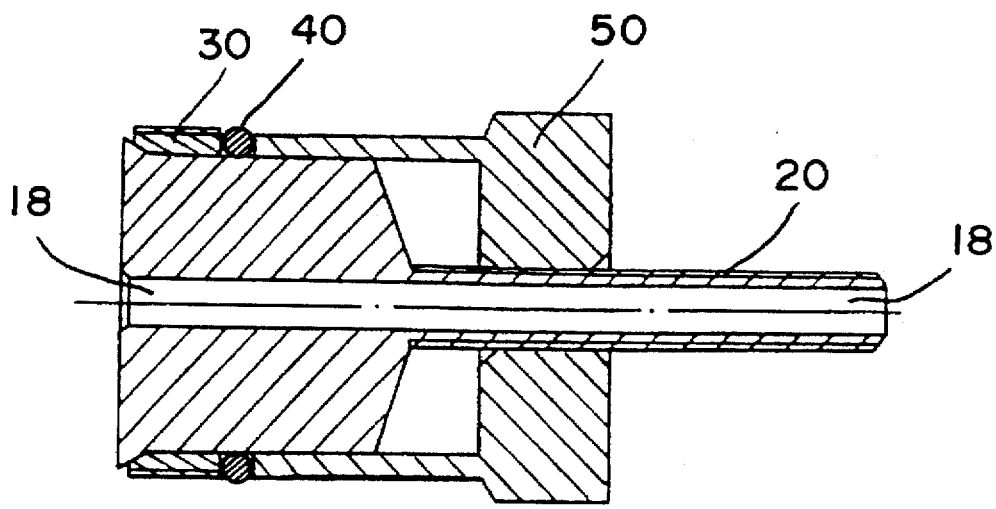
FIG. 4 is a sectional view of a second preferred embodiment of the coupling device of the invention.

FIG. 4 shows another embodiment of the coupling device of the invention. It can be seen that the coupling device 1 may comprise the coupling body 10, the expandable ring 30, the washer 40 and the press guide tube 50. The washer 40 is provided to prevent leakage of gas or liquid within the circular slot 90 from the contact surface between the coupling body 10 and the circular slot 90. It is therefore preferably made of resilient or elastic materials, such as rubber, so that when the guide tube 50 advances towards the front end 13 of the coupling body 10, the diameter of the washer 40 may be expanded, achieving leakage prevention. In order to prolong the life of the washer 40, the anti-friction ring 64 is disposed between the washer 40 and the guide tube 50 since the latter may, during advancement towards the front end 13, press against the washer 40 to accelerate its wear. The anti-friction ring 64, made of rigid material, is therefore provided to prevent damage to the washer 40.

Figure 3:
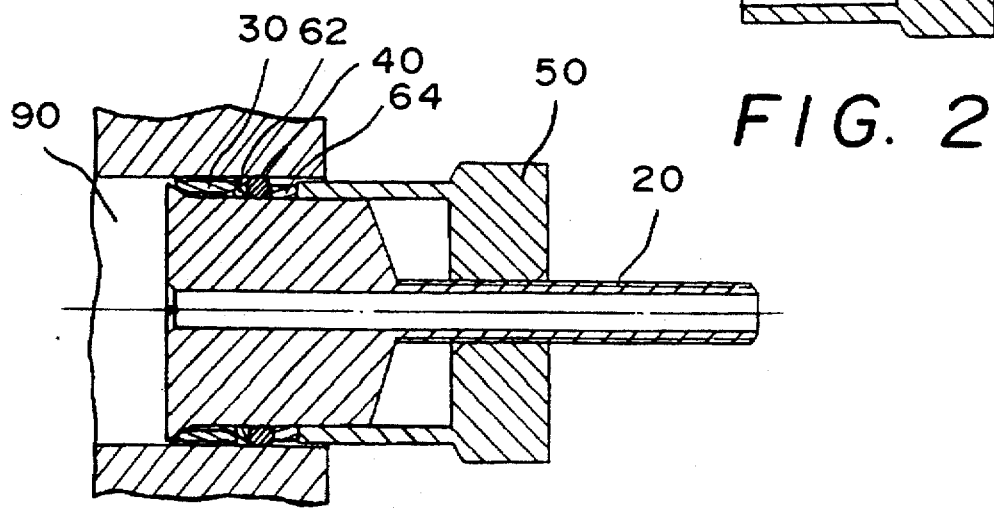
FIG. 3 is a sectional view showing connection of the coupling device of the invention and a circular slot.
Figure 6:
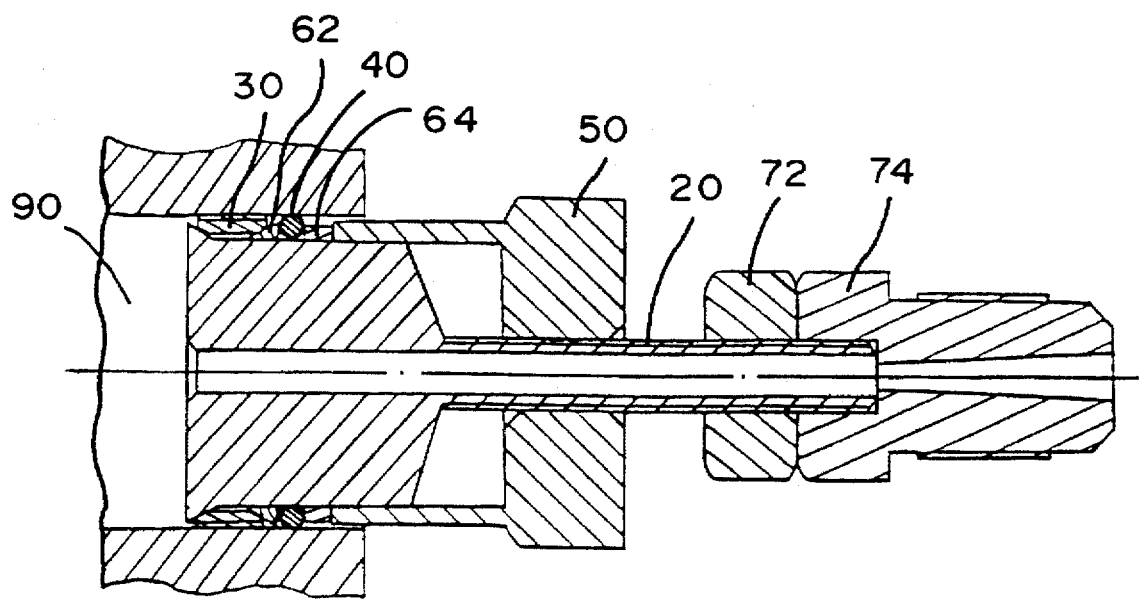
FIG. 6 is a sectional view of the coupling device of the invention in use.

Further reference is made to FIGS. 3 and 6. In order that the coupling device 1 and the circular slot 90 may be tightly coupled to prevent side leakage (gas or liquid will not leak from the peripheries of the coupling body 10 and the circular slot 90), the oblique portion 14 of the coupling head 12 should have a diameter smaller than the diameter of the internal diameter of the circular slot 90. Therefore, with the advancement of the guide tube 50 towards the oblique portion 14, the expandable ring 30 may be expanded to fit tightly against the inner wall of the circular slot 90 (see FIGS. 5A and 5B). To facilitate turning of the guide tube 50 so that the coupling device 1 may securely couple with the circular slot 90, the coupling body 10 should be fixedly secured so that it cannot move while the guide tube 50 is being turned forwardly.

FIG. 6 illustrates an effective way of turning the guide tube 50. An auxiliary nut 72 and a male nozzle connector 74 may be provided at the screw rod 20 of the coupling body 10, in which the male nozzle connector 74 has a plurality of outer threads which are sized to match a female nozzle connector 75 of the hose coupling 88 of the high-pressure pump 87. A standard female nozzle connector 75 has male (right) inner threads. Therefore, the male nozzle connector 74 should be configured to have right outer threads. In order to prevent other components from loosening, the outer threads of the first screw rod 22, the inner threads 52 of the guide tube 50, the inner threads of the auxiliary nut 72 and the inner threads of the male nozzle connector 74 should be female (left). Before turning the guide tube 50, the male nozzle connector 74 should be firmly fastened onto a tail end of the first screw rod 20 and the auxiliary nut 74 is then fastened in the direction of the male nozzle connector 74. When turning the guide tube 50, a wrench (or a Allen wrench) may be used to secure the auxiliary nut 72 and another wrench (or a Allen wrench) may be used to turn the guide tube 50 to advance it towards the front end 13, achieving effective turning and fastening of the guide tube 50.

Figure 7:
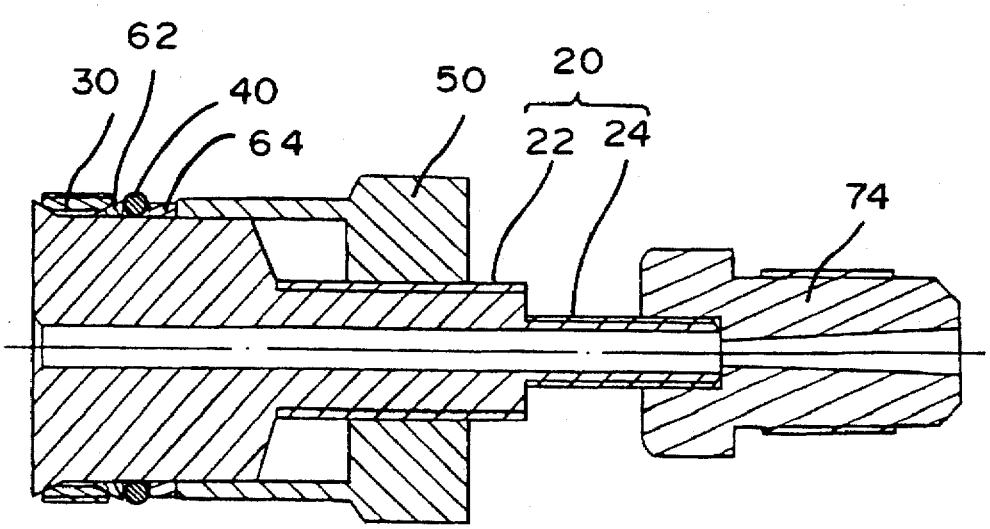
FIG. 7 is a sectional view of the coupling device of the second preferred embodiment of the invention.

FIG. 7 is a sectional view of the second embodiment of the invention. The major difference between the first embodiment and the second embodiment is that in the second embodiment the screw rod 20 of the coupling body 10 consists of a first screw rod 22 and a second screw rod 24, the first screw rod 22 and the second screw rod 24 having opposite threads. The second screw rod 24 is provided for the effective turning of the guide tube 50. In order to match the inner threads (male threads) of the standard female nozzle connector 75, the outer threads of the second screw rod 24 as well as the inner and outer threads of the male nozzle connector 74 are also male; the outer threads of the first screw rod 22 for pressing the threads 52 of the guide tube 50 should be female. Before turning the guide tube 50, the male nozzle connector 74 should be tightened onto a tail end of the second screw rod 24. And when the guide tube 50 is being turned, a wrench (or Allen wrench) may be used to secure the male nozzle connector 74 while another wrench (or Allen wrench) is used to turn the guide tube 50 in the direction of the front end 13. As the first screw rod 22 and the second screw rod 24 have opposite threads, the guide tube 50 may be effectively secured.

Figure 7A:
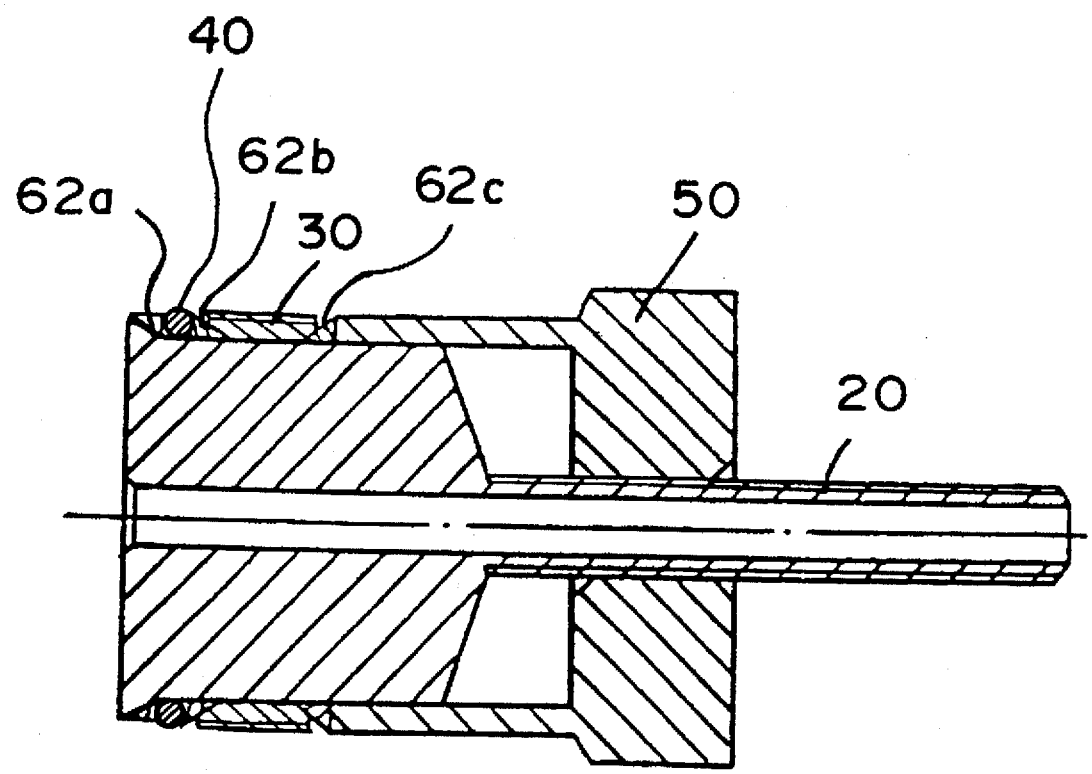
FIG. 7A is a sectional view of a third preferred embodiment of the coupling device of the invention.

Referring to the third preferred embodiment shown in FIG. 7A, the difference between this embodiment and the first preferred embodiment is that the order and quantity of the expandable ring 30, the washer 40 and the oblique ring 62 on the coupling head 12 are not the same. In this embodiment, starting from the front end 13 of the coupling body 10, the components fitted in turn on the coupling head 12 include a first oblique ring 62a, a washer 40, a second oblique ring 62c, an expandable ring 30 and a third oblique ring 62. When the guide tube 50 advances towards the front end 13, due to the geometrical arrangement of the oblique portion 14, the expandable ring 30 and the oblique rings 62a–62c in terms of their angles, the effects achievable by the first preferred embodiment may be accomplished by this embodiment as well. As the washer 40 in this embodiment is configured to be closer to the front end 13, the coupling of this embodiment is more suitable for use in shallower circular slots 90.

Furthermore, in order to check the gas or liquid in the circular slot 90, a nut may be secured on the tail end of the male nozzle connector 74 so that the coupling device 1 is capable of closing the circular slot 90.

In summary, the present invention is aimed to provide a coupling device for connecting a device or apparatus with a circular slot or a circular piping to prevent leakage from the contact surface between the coupling device and the circular slot. It should be understood that various modifications may be made to the present invention. For instance, a plurality of washers 40, expandable rings 30 or oblique rings 62 may be used; the arrangement or sequence of the components may be altered; the screw rod 20 is not necessarily provided with threads throughout its length.

Although the present invention has been illustrated and described with reference to the preferred embodiment thereof, it should be understood that it is in no way limited to the details of such embodiment but is capable of numerous modifications within the scope of the appended claims.

What is claimed is:

1. A coupling device configured to be attached to an object having a circular opening extending into the object from an external surface, the circular opening being bounded by an internal surface, the coupling device comprising:

a coupling body configured to fit into the circular opening and having a substantially cylindrical coupling head and a threaded screw rod extending therefrom, said coupling head having an oblique portion and a receiving portion, said receiving portion located intermediate said oblique portion and said threaded screw rod and a longitudinal slot being disposed within said coupling body and passing therethrough;

an expandable ring located on said receiving potion of said coupling body, the expandable ring having a surface facing the internal surface of the circular opening;

a washer located on said receiving portion of said coupling body, intermediate said expandable ring and said threaded screw rod; and a guide tube having a head portion threaded onto said threaded screw rod of said coupling body, and a pressing portion extending over at least a portion of the receiving portion of the coupling head, wherein longitudinal movement of the guide tube relative to the coupling body causes the pressing portion to urge the expandable ring against the oblique portion of the coupling head causing the expandable ring to expand so as to frictionally engage the internal surface of the circular opening while the head portion is located outside the object displaced from the external surface.

2. The coupling device as claimed in claim 1, further comprising an oblique ring located on said receiving portion of said coupling body, between the expandable ring and the washer.

3. The coupling device as claimed in claim 2, further comprising an anti-friction ring located on said receiving portion of said coupling body between the washer and the guide tube.

4. The coupling device as claimed in claim 3, further comprising a male nozzle connector threaded onto said screw rod.

5. The coupling device as claimed in claim 1, wherein said screw rod comprises a first screw rod and a second screw rod, said first screw rod being located between said receiving portion of said coupling body and said second screw rod, said guide tube being configured to thread onto said first screw rod, said first screw rod and said second screw rod having threads oriented into opposite directions.

6. The coupling device as claimed in claim 5, further comprising a male nozzle connector threaded onto said screw rod.

7. The coupling device as claimed in claim 1, further comprising three oblique rings located on said receiving portion of said coupling body.

8. The coupling device as claimed in claim 7, further comprising a male nozzle connector threaded onto said screw rod.

9. The coupling device as claimed in claim 1, wherein said expandable ring comprises a C-clip having at least one end with an oblique angle for matching the oblique portion of said coupling head.

10. The coupling device as claimed in claim 1, wherein said expandable ring comprises a C-clip having two ends provided with oblique angles matching the oblique portion of said coupling head.

11. The coupling device as claimed in claim 10, wherein said C-clip has an outer surface provided with a plurality of corrugated teeth.

* * * * *